United States Patent

Scheibitz et al.

[11] 3,991,164
[45] Nov. 9, 1976

[54] PROCESS FOR THE DEARSENICATION OF POLYPHOSPHORIC ACID

[75] Inventors: Wolfgang Scheibitz, Leverkusen; Hasso Spott, Erftstadt Balkhausen; Gero Heymer, Erftstadt Liblar, all of Germany

[73] Assignee: Hoechst Aktiengesellschaft, Frankfurt am Main, Germany

[22] Filed: Oct. 15, 1974

[21] Appl. No.: 514,450

[30] Foreign Application Priority Data

Oct. 20, 1973  Germany............................ 2352827

[52] U.S. Cl.................................. 423/316; 23/262; 423/321 R
[51] Int. Cl.²......................................... C01B 21/16
[58] Field of Search ................ 423/321, 321 S, 317, 423/416

[56] References Cited
UNITED STATES PATENTS

| | | | |
|---|---|---|---|
| 1,562,818 | 11/1925 | Wolfes et al............................ | 423/321 |
| 3,342,549 | 9/1967 | Sakomura et al....................... | 423/321 |
| 3,769,384 | 10/1973 | Kovacs et al. ......................... | 423/321 |
| 3,790,661 | 2/1974 | Wasel-Nielen et al............... | 423/321 |

*Primary Examiner*—Oscar R. Vertiz
*Assistant Examiner*—Wayne A. Langel
*Attorney, Agent, or Firm*—Connolly and Hutz

[57] ABSTRACT

Polyphosphoric acid is dearsenicated by placing the polyphosphoric acid in a reactor; adding a phosphorus oxo-compound containing phosphorus in the monovalent or trivalent electropositive oxidation stage; heating the resulting mixture to effect disproportionation of the phosphorus oxo-compound; and removing the resulting off-gas having arsenic therein.

5 Claims, 1 Drawing Figure

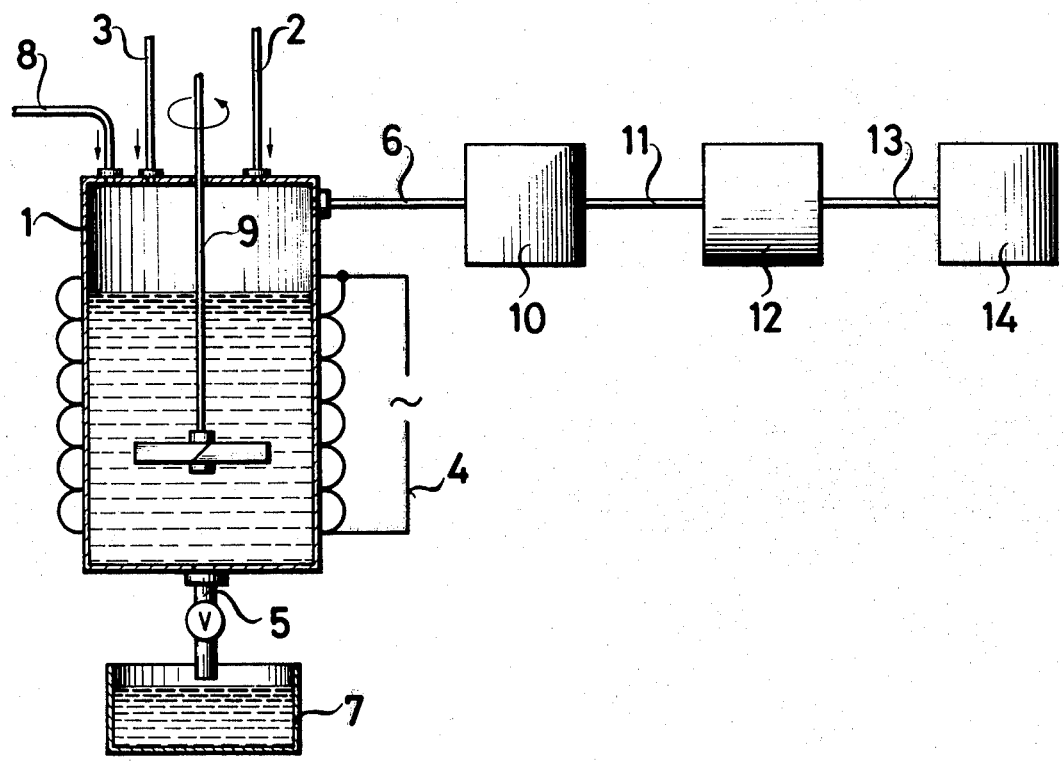

PROCESS FOR THE DEARSENICATION OF POLYPHOSPHORIC ACID

The present invention relates to a process and an apparatus for the dearsenication of polyphosphoric acid.

Polyphosphoric acid is normally produced by burning elementary phosphorus which in turn is produced by electrothermal means from naturally occurring phosphate ore. Phosphate ore always contains more or less arsenic as one of the elements accompanying phosphorus. As phosphorus and arsenic are elements which are closely related to one another, it is only natural for polyphosphoric acid to contain arsenic in the form of arsenic III or V-acid. Polyphosphoric acid, which is known to be comprised of a mixture of linear condensed phosphoric acids of the general formula $H_{n+2}P_nO_{3n+1}$, commonly contains As in proportions within the range about 0.001 and 0.01 %, for a $P_2O_5$-content within the range about 70 and 86 %. To be suitable for certain uses, it is, however, necessary for polyphosphoric acid or its secondary products to contain not more than 1 ppm (part per million) of arsenic. In other words, it is often necessary for the arsenic to be removed by special processes, of which few are really effective because of the chemical similarity of phosphorus and arsenic.

It has already been reported that elementary phosphorus can be freed at least partially from the arsenic contained therein. To this end, it is treated, prior to burning it, with sulfuryl chloride, for example, or subjected to steam sublimation in the presence of ion exchanger masses.

To avoid inconvenience which is caused thereby, it is preferable to burn elementary phosphorus to $P_2O_5$ or polyphosphoric acid which is dearsenicated later. This has exclusively been achieved heretofore by a separation method, wherein $H_2S$ or a metal sulfide solution is added to the polyphosphoric acid to cause precipitation of the arsenic which is contained therein in the form of a sulfide.

$$2\ H_3AsO_3 + 3H_2S \rightarrow As_2S_3 + 6\ H_2O \tag{1}$$

If use is made of this process, it is always necessary for the $As_2S_3$ produced to be removed in an additional separate operation (see U.S. Pat. No. 3,790,661). The filtration of viscous polyphosphoric acid is normally a rather problematic process which is required to be carried out at elevated temperature, under pressure and with the use of filter aids, such as active carbon and kieselguhr.

The present invention now provides a process for the dearsenication of polyphosphoric acid by means of an addend which need not be separated, in the absence of any significant contamination of the polyphosphoric acid by undesirable foreign substances. As has unexpectedly been found, it is possible to produce polyphosphoric acid free from arsenic by subjecting one or more phosphorus oxo-compounds containing phosphorus in the mono- or trivalent electropositive oxidation stage to thermal disproportionation. It is more particularly possible to effect the decomposition, for example, of phosphorous acid contained in polyphosphoric acid and, in analogous fashion, also of hypophosphorous acid, phosphites and hypophosphites, in the manner illustrated in the following formulae:

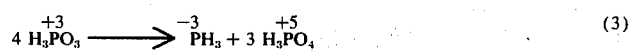

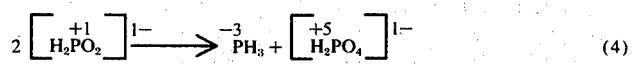

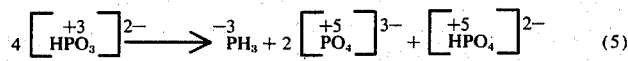

The process of the present invention comprises more particularly: placing polyphosphoric acid in a reactor; adding a phosphorus oxo-compound containing phosphorus in the monovalent or trivalent electropositive oxidation stage; heating the resulting reaction mixture to effect disproportionation of the phosphorus oxo-compound; and removing the resulting offgas having the arsenic in the form of $AsH_3$ therein.

The reaction mixture should conveniently be heated to temperatures within the range 200° and 400° C.

The phosphorous oxo-compound should preferably be used in proportions within the range 0.1 and 50 weight %, more preferably within the range 0.1 and 0.5 weight %, based on polyphosphoric acid.

While heating the reaction mixture, an inert gas, e.g. nitrogen or argon, should advantageously be passed through the reactor and the reaction mixture should preferably be stirred.

P—(V)—bonds are the only condensed phases which are produced in the reaction of this invention. As a result, the polyphosphoric acid is not chemically modified or contaminated. In other words, it is possible to add minor quantities of lower P-compounds as only minor proportions thereof are obviously necessary for effecting the dearsenication.

The present process could not be expected to produce the effects described hereinabove as neither $PH_3$ nor further conventional reductants, such as hydrazine or nascent hydrogen ($Zn + H_3PO_4$) could be found in blank tests to effect the removal of arsenic, under the conditions described.

It is possible for the process of the present invention to be carried out continuously or intermittently in an apparatus, such as that shown diagrammatically and by way of example, in the accompanying drawing.

As can be seen, the apparatus comprises a closed reactor 1 being provided with inlets 2 and 3 for the supply of the polyphosphoric acid, which is to be purified, and of the phosphorus oxo-compound, respectively, and being furthermore provided with a heating means 4, an outlet valve 5 and an off-gas outlet 6.

The reactor should preferably be made of acidproof material or of graphite-lined material.

Placed below the outlet valve 5 is a collector 7 receiving purified polyphosphoric acid.

In a preferred form of apparatus, the reactor is additionally provided with an inlet 8 for the supply of inert gas and, if desired, with an agitator 9, which should preferably be made of acidproof material, e.g. graphite, or of graphite-lined material.

It is also advantageous for the off-gas outlet 6 to be connected to an off-gas scrubbing means 10, which in turn may be connected through a conduit 11 to a combustion chamber 12 communicating through a further conduit 13 with a further scrubbing means 14 for scrubbing off-gas which originates from the combustion chamber.

EXAMPLE 1

1.68 kg of polyphosphoric acid containing 85 weight % of $P_2O_5$ and 30 ppm of arsenic was placed in an acidproof heatable reactor and heated therein. At a temperature approximately of 50° C, the acid was admixed with 11 g of $NaH_2PO_2 \cdot H_2O$ (this corresponded to 0.5 weight % of $NaH_2PO_2$, based on the acid), and the resulting mixture was heated with agitation (approximately at a speed of 50 rpm). At the same time, nitrogen as an inert gas was introduced into the reactor and off-gas originating from the reactor, which contained the inert gas together with $PH_3$ and $AsH_3$, was collected, scrubbed, burnt in a combustion chamber, and the off-gas coming from the combustion chamber was scrubbed again.

During the heating period, the progressing dearsenication was controlled analytically. After 30 minutes, the reaction mixture was at a temperature of 120° C and contained 10 ppm of arsenic. After 50 minutes, the temperature was at 200° C and the content of arsenic had dropped to 1 ppm. After 90 minutes, the temperature was 350° C and the As-content was less than 0.1 ppm.

EXAMPLE 2

1.8 kg of polyphosphoric acid the same as that used in Example 1 was reacted with 8 g of $H_3PO_3$ of 100 % strength, under analogous conditions. After 60 minutes, the acid had a temperature of 300° C and contained 0.3 ppm of arsenic.

EXAMPLE 3

1.65 kg of polyphosphoric acid the same as that used in Example 1 was reacted with 10 g of a 50 weight % aqueous $H_3PO_2$ solution, under analogous conditions. After 60 minutes, the acid had a temperature of 200° C and contained less than 1 ppm of arsenic.

EXAMPLE 4

2.05 kg of polyphosphoric acid the same as that used in Example 1 was reacted with 20 g of $Na_2HPO_3 \cdot 5 H_2O$, under analogous conditions. After 60 minutes, the acid had a temperature of 300° C and contained less than 1 ppm of arsenic.

We claim:

1. A process for the dearsenication of polyphosphoric acid, which comprises placing the polyphosphoric acid in a reactor; adding a phosphorus oxo-compound containing phosphorus in the monovalent or trivalent electropositive oxidation stage in proportions within the range 0.1 and 50 weight %, based on the polyphosphoric acid; heating the resulting mixture to temperatures within the range 200 and 400° C to effect disproportionation of the phosphorus oxo-compound; and removing the resulting off-gas having arsenic therein in the form of $AsH_3$.

2. The process as claimed in claim 1, wherein an inert gas is passed through the reactor while the reaction mixture is heated therein.

3. The process as claimed in claim 2, wherein the inert gas is nitrogen or argon.

4. The process as claimed in claim 1, wherein the phosphorus oxo-compound is used in proportions within the range 0.1 and 0.5 weight %, based on the polyphosphoric acid.

5. The process as claimed in claim 1, wherein the reaction mixture is stirred.

* * * * *